Sept. 2, 1958     H. C. THORSTENS     2,849,929
BROACHING ATTACHMENT
Filed May 9, 1955

Inventor
Harold C. Thorstens
By McCanna and Morsbach
Attys.

United States Patent Office 2,849,929
Patented Sept. 2, 1958

2,849,929

BROACHING ATTACHMENT

Harold C. Thorstens, Rockford, Ill.

Application May 9, 1955, Serial No. 506,770

4 Claims. (Cl. 90—33)

This invention relates to a broaching apparatus and more particularly to a broaching attachment for use on screw machines and the like.

In the formation of articles requiring machining operations which can be performed on automatic screw machines as well as a broaching operation, it has been found more expedient to also form the broaching operation on the screw machine wherever possible. Such machines, however, are not primarily designed for broaching and when conventional broaching apparatus are used on these machines, frequent failures have occurred in the mechanism for extending and retracting the turret slide. When the turret slide is extended to force the broach into the workpiece, the broach and turret travel at least a short distance before engaging the workpiece and consequently the inertia of the turret slide is overcome before the broaching operation is started. After the turret has begun its extending movement, it has been found that the turret slide operating mechanism is adequate to thereafter extend the broach into the workpiece, the inertia of the moving slide assisting in carrying the broach into the work. However, when retracting the broach from the broached hole in the workpiece, the frictional drag of the broach on the workpiece as well as the inertia of the turret slide must be overcome by the slide operating mechanism. This combined load has been found to overload the slide operating mechanism and cause relatively frequent failures in the operating mechanism which require repairs that are costly due both to the parts and labor required as well as to the prolonged time during which the machine must remain idle for the repairs.

In such screw machines, the other machine operations are generally performed while the workpiece is rotating. In order to permit broaching without stopping the workpiece, the broach is arranged to rotate with the workpiece during the broaching operation. It has heretofore been proposed to rotatably support the broach holder and move the broach into engagement with a rotating workpiece to cause the broach and broach holder to rotate in unison with the workpiece. However, because of the large mass of the broach holder, the latter could not be rapidly brought up to the speed of the workpiece without imposing high torsional stresses on the broach which tends to damage the broach and workpiece.

It is an important object of this invention to provide a novel broaching attachment which enables retracting of the broach from the workpiece without imposing excessive loads on the turret slide operating mechanism.

Another object of this invention is the provision of a broaching attachment having an improved construction for effecting rotation of the broach in unison with the workpiece to permit the broaching operation to be rapidly performed on rotating pieces.

Another object of this invention is the provision of an improved rotary support for the broach.

A more particular object of this invention is the provision of a broaching attachment including a housing and a broach holder, in which the broach is rotatably supported in the broach holder so as to rotate relative thereto upon initial contact of the broach with the workpiece, and in which the broach holder is rotatably supported in the housing by thrust bearings so as to thereby rotate with the broach as pressure is applied to the broach to urge it into the workpiece.

An additional object of this invention is the provision of a broaching attachment in which the broach is mounted for limited axial lost motion to enable partial retraction of the broaching attachment away from the work piece before retraction of the broach is started, whereby the turret slide operating mechanism does not operate against the frictional drag of the broach until after the inertia of the turret and turret slide has been overcome and the latter is moving in a direction to retract the broach.

These, together with various ancillary objects and advantages of this invention will be more readily appreciated as the same becomes better understood by reference to the following detailed description when taken in connection with the accompanying drawings wherein.

Figures 1, 2, 3:
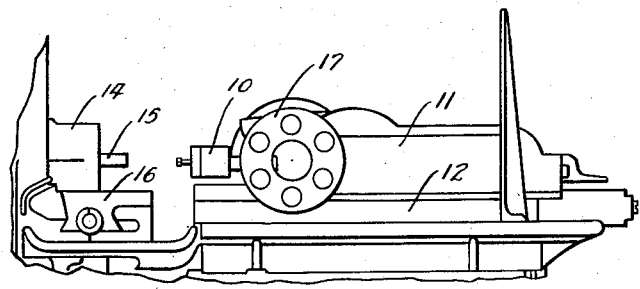
Figure 1 is a fragmentary side elevational view of a screw machine having the broaching attachment of the present invention mounted thereon.
Fig. 2 is a longitudinal sectional view through the broaching attachment with parts of the attachment shown in elevational.
Fig. 3 is an end elevational view of the broaching attachment.

The broaching attachment of the present invention, indicated generally by the numeral 10 is generally applicable for use with various different machines to perform a broaching operation, but is specifically designed for use on automatic screw machines of the type shown in Fig. 1. As is conventional, the machines include a turret slide 11 mounted for reciprocation on a bed 12, which turret slide is positively driven to extend the turret towards the workpiece and retract the turret away from the workpiece by the slide operating mechanism (not shown). As is well known, the slide operating mechanism operates in timed relation with the mechanism for indexing the turret to sequentially pass each of the tools carried by the turret into and out of operative relation with the workpiece.

The screw machine also includes a chuck 14 for holding the workpiece and for rotating the latter and suitable stock feed mechanism in the hollow feed spindle of the chuck (not shown) for feeding the stock 15 through the chuck and thereafter reclamping the chuck onto the stock to drive the latter. One or more cross slides 16 are customarily provided and arranged to carry suitable tools for performing operations on the workpiece.

As best shown in Fig. 2, the broaching attachment 10 includes a broach housing 21 preferably in the form of a cylindrical body 22 having an end wall 23 at one end thereof and an axially disposed mounting shank 24 extending from the end wall and conveniently formed integrally therewith. The shank 24 is arranged to be mounted in one of the tool receiving bores in the turret 17 whereby the broaching attachment is moved by the turret into and out of engagement with the workpiece. A broach holder 27 is rotatably mounted in the broach housing and includes a tubular body having a bore 28 extending therethrough. A broach 29 having a body portion 31 is mounted in the bore 28 in the broach holder and extends outwardly therefrom, a broaching head 32 being formed at the outer end of the broach.

In accordance with the present invention, the broach 29 is rotatably mounted in the broach holder 27 to permit the broach to rotate relative to the holder, upon initial contact with the workpiece whereby the broach may rapidly come up to the speed of the workpiece. For this purpose, the body portion 31 of the broach is formed with a cylindrical outer periphery which is rotatably received in the tubular broach holder 27. The broach is also mounted for limited axial lost motion with respect to the broach holder to permit the broaching attachment to be partially retracted from the workpiece without moving the broach. In this manner, the direction of movement of the turret slide and turret may be reversed without imposing the frictional drag of the broach on the workpiece on the turret slide operating mechanism, until after the turret slide has begun to move in a direction to retract the latter. As best shown in Fig. 2 the inner end of the broach holder 27 is counterbored at 35 to provide an inwardly facing shoulder 36. An outwardly extending peripheral flange 37 is formed on the inner end of the broach and is slidably received in the counterbore 35. A compression spring 38 is interposed between the shoulder 36 and the flange 37 to yieldably urge the broach inwardly of the broach holder, and a stop 39 is attached to the inner end of the broach holder and positioned to engage the inner end of the broach to limit inward movement of the latter. In the embodiment shown in the drawings, the stop 39 is threaded into the end of the broach holder and is formed with an axial passageway 41 which extends therethrough.

As previously described, the broach holder is rotatably mounted within the housing 21 and for this purpose there is provided a needle bearing assembly including an inner bushing or bearing race 44 which is snugly disposed around the periphery of the broach holder. A plurality of needle bearings 45 are interposed between the inner race 44 and the housing to provide a radial anti-friction bearing for the broach holder. A collar 47 is formed on the outer periphery of the broach holder, intermediate the ends thereof and is arranged to engage the outer end of the bearing race 44. The inner end of the bearing race 44 abuts against an anti-friction thrust bearing 51 having spaced bearing races 49 and 50 and a plurality of anti-friction elements 52 therebetween, which thrust bearing is disposed within the housing in abutting engagement with the end wall 23 thereof. An outer thrust bearing 54 including spaced races 53 and 55 and anti-friction elements 56, is disposed around the broach holder adjacent the open end of the housing, and is arranged to engage the outwardly extending collar 47 on the broach holder. A cap member 58 is attached to the open end of the housing for adjustment axially thereof and, as shown in the drawings, is threadedly mounted on the housing, an inwardly extending flange 59 being provided on the collar to extend inwardly thereof into closely spaced adjacency to the outer periphery of the broach holder 27. As is apparent, the inwardly extending flange 59 engages the outer race 53 of the outer thrust bearing 54.

The broach holder is thus mounted for free rotation within the housing 21 and thrust bearings are provided to prevent axial movement of the broach holder relative to the housing while permitting the aforementioned free rotation of the broach holder. The cap 58 is threadedly adjustable along the housing to urge the flange 59 thereon into engagement with the outer race 53 of the outer thrust bearing 54. This urges the outer thrust bearing into engagement with the collar 47 on the broach holder and the latter, acting upon the inner bearing race 44 of the needle bearing assembly, presses against the inner thrust bearing 51. In this manner, the cap is effective to tighten the inner and outer thrust bearings onto the broach holder.

The broach 29 is formed with an axially extending passage 61, which passage extends completely through the broach and communicates with the passage 41 in the stop member 39. The mounting shank 41 is also formed with an axially extending passage 62 whereby there is provided an open passage which extends completely through the broaching attachment and through the broach.

In the broaching of holes in the workpieces in an automatic screw machine, a hole is first bored into the workpiece and the broach thereafter moved into and out of the bore to broach the hole therein. Customarily, the workpiece is flooded with cutting oil, which cutting oil substantially fills the bore in the workpiece. The broaching attachment construction wherein the passage extends completely through the broach and broach holder permits the fluid which is entrapped in the bore in the workpiece, between the broach and the end of the bore, to escape through the passage 61 in the broach as the broach enters the workpiece, the passage 61 also functioning to admit fluid to the broached hole as the broach is withdrawn therefrom to prevent the creation of a dashpot effect. This materially facilitates the insertion and removal of a broach from a bore.

From the foregoing it is thought that the operation of the broaching attachment will be readily understood. The shank 24 is mounted in one of the tool receiving bores in the turret for reciprocation thereby into and out of engagement with the workpiece carried by the chuck 14. The spring 38 normally maintains the inner end of the broach in engagement with the stop 39. As the broaching attachment is extended into engagement with the workpiece, the broach 29, upon initial engagement with the workpiece, will begin to rotate therewith and, by reason of its relatively light weight, will be rapidly brought up to the speed of the rotating workpiece. As the turret slide is further extended to urge the broach into the workpiece, the inner end of the broach is pressed firmly against the stop 39 by an increased pressure necessary to force the broach into the workpiece and the frictional resistance between the broach and broach holder will then cause the latter to rotate in unison with the broach. In this manner, the relatively heavy broach holder may be gradually brought up to the speed of the rotating workpiece without imposing excessive stresses on the broach or damaging the workpiece. The reaction on the broach, as it is formed into the workpiece, urges the broach holder inwardly. The inward thrust on the broach holder is transmitted by the collar 47 thereon through the inner race 44 of the needle bearing assembly to the inner thrust bearing 51.

As the direction of movement of the turret slide is reversed to retract the broach from the workpiece, the broach 29 slides outwardly relative to the broach holder 27 and compresses the relatively light spring 38. This permits the turret slide operating mechanism to reverse the direction of movement of the turret slide before the frictional drag of the broach in the workpiece becomes effective to impede retraction of the slide. After the turret slide and turret have begun movement in a direction to retract the broach, the spring 38 compresses sufficiently to prevent further sliding movement relative to the broach holder whereupon the broach is withdrawn with the broach holder. During retraction of the broach, the axial thrust on the broach holder is transmitted by the collar 47 thereon through the outer thrust bearing 54 to the cap 58 in the housing.

Although the passages in the broaching attachment and broach are arranged to permit the escape of lubricant from the broached hole, as the broach is moved into the hole, it is apparent that the axially arranged passages are also adaptable to convey lubricant to the tip of the broach. For this purpose lubricant may be conveyed by any suitable means to the hollow mounting shank 24 to thereby force lubricant through the passage 62 therein and through the passage 41 of the stop into the passage 61 in the broaching tool to lubricate the tip of the broach as well as the working parts of the broaching attachment.

I claim:

1. In a broaching attachment adapted to be extended and retracted toward and away from a rotary workpiece to broach a hole therein, the combination of a housing, means for mounting the housing on a tool holder, a broach holder, means including thrust bearings for rotatably supporting said broach holder in said housing and for preventing axial movement of the broach holder with respect thereto, a broach slidably and rotatably mounted on said holder, and stop means on the holder engageable with the broach to limit inward sliding of the broach with respect thereto, said broach having a mass less than the mass of said broach holder whereby the broach is adapted to rotate with respect to the broach holder upon initial engagement of the broach with the rotating workpiece and, upon being forced into the workpiece, to firmly engage said stop means and cause the broach holder to rotate with the broach.

2. In a broaching attachment adapted to be extended and retracted toward and away from a rotating workpiece to broach a hole therein, the combination of a housing, means for mounting the housing on a tool holder, a broach holder, means including thrust bearings for rotatably supporting said broach holder in said housing and for preventing axial movement of the broach holder with respect thereto, a broach slidably and rotatably mounted on said holder, stop means on said broach holder for limiting sliding of the broach relative to the broach holder between preselected limits to provide limited axial lost motion between the broach and the broach holder, and spring means interposed between the broach and the broach holder yieldably urging the broach to its innermost position, said broach having a mass less than the mass of said holder to thereby rotate relative to said broach holder upon initial engagement of the broach with the rotating workpiece whereby the broach rapidly reaches the rotational speed of the workpiece, said broach upon being forced into the workpiece engaging said stop means to thereby cause the broach holder to rotate therewith, said spring means being arranged to yield and permit the broach to slide outwardly relative to the holder against the bias of said spring as the housing is initially moved in a direction to retract the broach.

3. In a broaching attachment, a housing comprising a hollow body having a shoulder at the inner end, a broach holder in said body, an inner thrust bearing in said body abutting said shoulder, an outer thrust bearing located adjacent the other end of said body, an outwardly extending peripheral flange on said holder abutting one of said thrust bearings, a bushing on said holder abutting said flange at one end and the other thrust bearing at the other end, a radial anti-friction bearing disposed between said bushing and said body to rotatably support said broach holder therein, a bearing retainer adjustably mounted on said body and engaging the outer thrust bearing, a broach slidably and rotatably mounted on said holder, and means on the holder engageable with the broach for limiting axial sliding movement of the broach between preselected limits.

4. A broaching attachment adapted to be extended and retracted toward and away from a rotating workpiece to broach a hole therein, the combination of an enlarged hollow body open at one end and having a shoulder at the other end, a broach holder disposed within said body, an inner thrust bearing abutting said shoulder, an outer thrust bearing located adjacent the outer end of said body, means on said broach holder defining spaced shoulders engageable with said inner and outer thrust bearings to constrain said holder against axial movement on said housing, radial bearing means disposed in said housing between said inner and outer thrust bearings for rotatably supporting said holder in said housing, a bearing retainer adjustably mounted on said housing and engaging said outer thrust bearing, said holder having a bore extending therethrough, a broach having a mass less than the mass of said holder slidably and rotatably disposed in said bore, and means on said holder engageable with said broach for limiting axial sliding movement of said broach relative thereto.

References Cited in the file of this patent

UNITED STATES PATENTS

| 589,576 | Rickey | Sept. 7, 1897 |
| 1,442,149 | Hjorth | Jan. 16, 1923 |
| 1,952,194 | Drissner | Mar. 27, 1934 |
| 2,192,434 | Critchfield | Mar. 5, 1940 |
| 2,387,582 | Helming | Oct. 23, 1945 |

FOREIGN PATENTS

| 263,169 | Germany | Aug. 2, 1913 |
| 273,472 | Switzerland | Feb. 15, 1951 |
| 881,674 | France | Feb. 4, 1943 |